United States Patent
Sugiyama et al.

(10) Patent No.: US 11,112,625 B2
(45) Date of Patent: Sep. 7, 2021

(54) OPTICAL MODULATOR INCLUDING ELECTRO-OPTIC POLYMER IN GROOVES HAVING MULTIPLE WIDTHS

(71) Applicant: Fujitsu Optical Components Limited, Kawasaki (JP)

(72) Inventors: Masaki Sugiyama, Kawasaki (JP); Tamotsu Akashi, Atsugi (JP)

(73) Assignee: FUJITSU OPTICAL COMPONENTS LIMITED, Kawasaki (JP)

( * ) Notice: Subject to any disclaimer, the term of this patent is extended or adjusted under 35 U.S.C. 154(b) by 0 days.

(21) Appl. No.: 16/923,549

(22) Filed: Jul. 8, 2020

(65) Prior Publication Data
US 2021/0063778 A1 Mar. 4, 2021

(30) Foreign Application Priority Data
Aug. 27, 2019 (JP) .............................. JP2019-155051

(51) Int. Cl.
  *G02F 1/065* (2006.01)
  *G02F 1/025* (2006.01)
(52) U.S. Cl.
  CPC .............. *G02F 1/065* (2013.01); *G02F 1/025* (2013.01)
(58) Field of Classification Search
  None
  See application file for complete search history.

(56) References Cited

U.S. PATENT DOCUMENTS

| | | | |
|---|---|---|---|
| 10,684,530 B1* | 6/2020 | Bian | G02F 1/29 |
| 2005/0054199 A1* | 3/2005 | Block | G02F 1/025 438/689 |
| 2009/0074346 A1* | 3/2009 | Peyghambarian | G02F 1/065 385/3 |
| 2011/0170820 A1* | 7/2011 | Prather | G02F 1/065 385/2 |
| 2014/0086523 A1 | 3/2014 | Block et al. | |
| 2016/0306256 A1* | 10/2016 | Sun | G02B 6/138 |
| 2017/0045762 A1* | 2/2017 | Huang | G02F 1/025 |
| 2021/0033896 A1* | 2/2021 | Sugiyama | H04B 10/516 |
| 2021/0033897 A1* | 2/2021 | Sugiyama | G02F 1/225 |

* cited by examiner

*Primary Examiner* — Michael Stahl
(74) *Attorney, Agent, or Firm* — Staas & Halsey LLP

(57) ABSTRACT

An optical transmission device has a modulator, a first terminal groove, and relay groove. The modulator has a groove on a waveguide formed on a substrate. EO polymer is placed in the groove in the modulator. The modulator modulates light propagated through the waveguide by changing the phase of the light propagated through the waveguide through change of the refractive index of the EO polymer placed in the groove in the modulator by means of an electric signal. The first terminal groove is formed on the substrate and has a width larger than a width of the groove in the modulator. The relay groove is formed on the substrate and communicates with the groove in the modulator and the first terminal groove. Furthermore, the EO polymer is placed in the relay groove and the first terminal groove.

7 Claims, 14 Drawing Sheets

OPTICAL MODULATOR INCLUDING ELECTRO-OPTIC POLYMER IN GROOVES HAVING MULTIPLE WIDTHS

CROSS-REFERENCE TO RELATED APPLICATION

This application is based upon and claims the benefit of priority of the prior Japanese Patent Application No. 2019-155051, filed on Aug. 27, 2019, the entire contents of which are incorporated herein by reference.

FIELD

The embodiments discussed herein are related to optical devices.

BACKGROUND

Optical devices, such as optical modulators, are being miniaturized. Silicon waveguides have strong light confinement effects and enable reduction in bending radii of the waveguides, and thus enable sizes of optical modulators to be decreased as compared to conventional LN modulators or compound semiconductor modulators. An optical modulator using a silicon waveguide has a PN junction provided in the silicon waveguide, and application of voltage to the PN junction via a metal wiring generates an electric field at the junction and changes the refractive index of the silicon waveguide. When the refractive index of the silicon waveguide is changed, the speed of light propagated through the silicon waveguide is changed and the phase of light output from the silicon waveguide is changed. An optical modulator using a silicon waveguide is able to modulate light by means of an electric signal by utilization of this characteristic.

However, in the optical modulator utilizing the PN junction, the amount of change in the refractive index of the silicon waveguide upon application of voltage is small. Accordingly, a large voltage is to be applied to the PN junction for acquisition of a desired refractive index, and the optical modulator thus consumes much electric power.

Therefore, optical modulators using electro-optic (EO) polymer instead of PN junctions have been examined (as seen in, for example, U.S. Patent Application Publication No. 2014/0086523). In an optical modulator using EO polymer, application of voltage to the EO polymer generates an electric field that changes the refractive index of the EO polymer. With the optical modulator using the EO polymer, a larger amount of change in the refractive index is achieved by a smaller voltage than with an optical modulator utilizing a PN junction, and the driving voltage for the optical modulator using the EO polymer is thus able to be made lower.

In the optical modulator using the EO polymer, the EO polymer is placed on a silicon waveguide. The EO polymer in, for example, a liquid state, is applied on the silicon waveguide in the optical modulator. As optical devices are miniaturized, the regions of silicon waveguides in optical modulators become smaller, and EO polymer is applied by use of nozzles having thinner distal ends than conventional ones. However, when the region of a silicon waveguide becomes small, positioning between the thinner distal end of a nozzle and the region of the silicon waveguide becomes difficult. Furthermore, when the distal end of the nozzle is thin, depending on the viscosity of the EO polymer, a given amount of the EO polymer may be not discharged continuously from the distal end of the nozzle. A sufficient amount of the EO polymer may thus be not applied to the region of the silicon waveguide. If a sufficient amount of the EO polymer is not applied to the region of the silicon waveguide, the amount of change in the phase of light propagated through the silicon waveguide becomes small. As a result, frequency characteristics of an optical signal after modulation may be degraded.

SUMMARY

According to an aspect of an embodiment, an optical device includes a groove and an optical modulator, a first terminal groove, and a relay groove. The groove is formed on a waveguide on a substrate and formed in a longitudinal direction. An electro-optic (EO) polymer is placed in the groove. The optical modulator modulates light propagated through the waveguide by changing phase of the light propagated through the waveguide through change of a refractive index of the EO polymer placed in the groove by means of an electric signal. The first terminal groove is formed on the substrate and has a width larger than a width of the groove in the optical modulator. The width of the groove in the optical modulator is along a direction perpendicular to a direction in which the light is propagated. The a relay groove is formed on the substrate and communicates with the groove in the optical modulator and the first terminal groove. The EO polymer is placed in the groove in the optical modulator, the relay groove, and the first terminal groove.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Preferred embodiments of the present invention will be explained with reference to accompanying drawings. The embodiments described below do not limit the techniques disclosed herein.

[a] First Embodiment

Configuration of Optical Transmission and Reception Device 10

Figure 1:
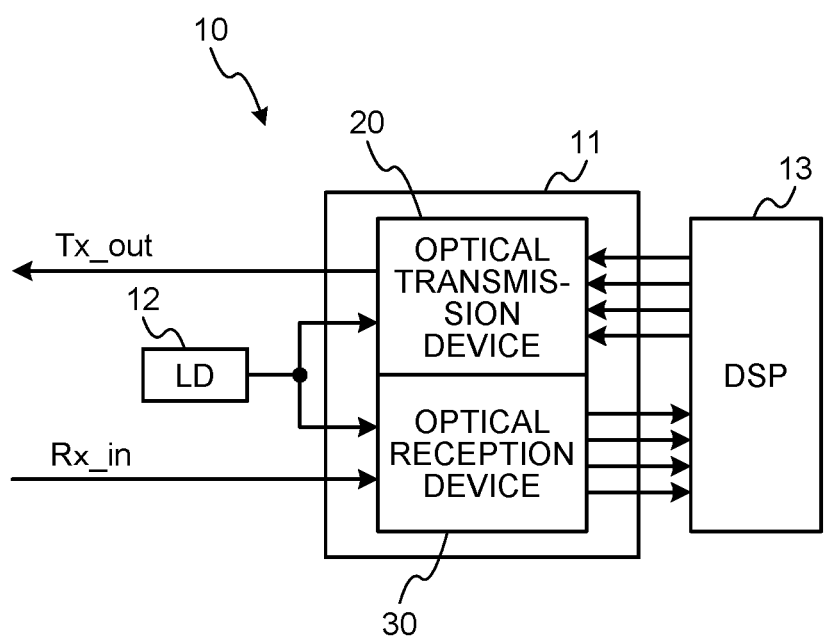
FIG. 1 is a diagram illustrating an example of an optical transmission and reception device.

FIG. 1 is a diagram illustrating an example of an optical transmission and reception device 10. The optical transmission and reception device 10 according to a first embodiment includes an optical transmission and reception unit 11, a laser diode (LD) 12, and a digital signal processor (DSP) 13. The optical transmission and reception unit 11 has an optical transmission device 20 and an optical reception device 30. The optical transmission device 20 and the optical reception device 30 are examples of an optical device.

The optical transmission device 20 modulates light supplied from the LD 12, based on a transmission signal output from the DSP 13. The optical transmission device 20 then outputs an optical signal (Tx_out) modulated according to the transmission signal. The optical reception device 30 receives an optical signal (Rx_in). The received optical signal is polarization-divided, demodulated by use of light supplied from the LD 12, converted into an electric signal, and the electric signal is output to the DSP 13.

Configuration of Optical Transmission Device 20

Figure 2:
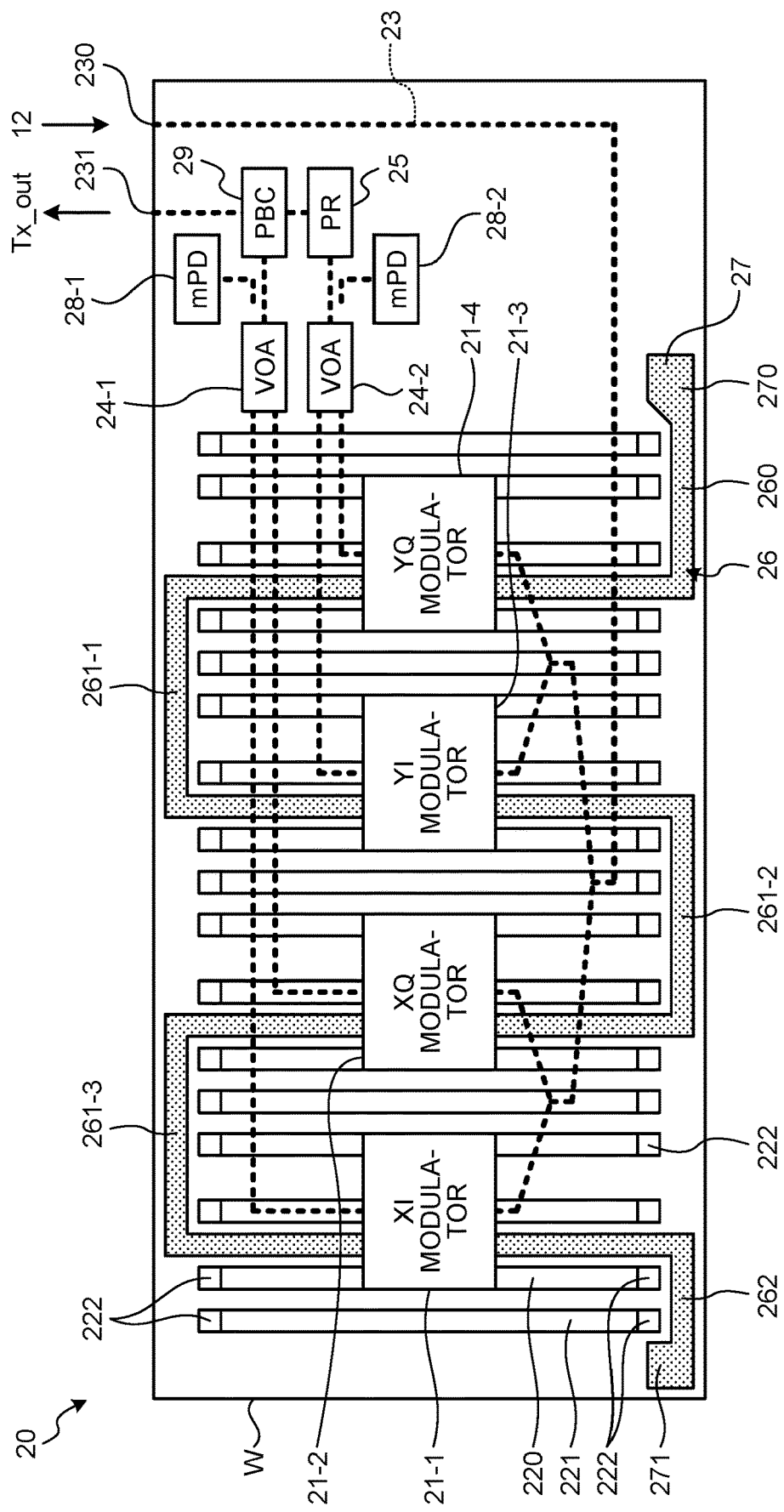
FIG. 2 is a diagram illustrating an example of an optical transmission device according to a first embodiment.

FIG. 2 is a diagram illustrating an example of the optical transmission device 20 according to the first embodiment. The optical transmission device 20 has an XI modulator 21-1, an XQ modulator 21-2, a YI modulator 21-3, and a YQ modulator 21-4. Furthermore, the optical transmission device 20 has a VOA 24-1, a VOA 24-2, a PR 25, EO polymer 27, an mPD 28-1, an mPD 28-2, and a PBC 29. "VOA" is an abbreviation for "variable optical attenuator", "PR" is an abbreviation for "polarization rotator", "mPD" is an abbreviation for "monitor photodiode", and "PBC" is an abbreviation for "polarization beam combiner".

Hereinafter, when the XI modulator 21-1, XQ modulator 21-2, YI modulator 21-3, and YQ modulator 21-4 are generally referred to without distinction among them, they will be referred to as the "modulators 21". Furthermore, hereinafter, when the VOA 24-1 and VOA 24-2 are generally referred to without distinction between them, they will be referred to as the VOAs 24, and when the mPD 28-1 and mPD 28-2 are generally referred to without distinction between them, they will be referred to as the mPDs 28. In addition, in FIG. 2, for visibility of the diagram, the EO polymer 27 is hatched.

The modulators 21, the VOAs 24, the PR 25, the EO polymer 27, the mPDs 28, and the PBC 29 are formed on a substrate W. Furthermore, the substrate W has, formed thereon, a waveguide 23 that propagates an optical signal therethrough. Light output from the LD 12 is input from an input end 230 of the waveguide 23 to be input to each of the modulators 21 via the waveguide 23. Each of the modulators 21 has, arranged therein along the waveguide 23: a signal wiring 220 that transmits a transmission signal that is an electric signal; a ground wiring 221 connected to a ground; and EO polymer placed between the signal wiring 220 and the ground wiring 221.

Both ends of the signal wirings 220 and ground wirings 221 have pads 222 provided thereon. Pads of signal wirings of an external substrate provided with a driver circuit, for example, which supplies, to the optical transmission device 20, an electric signal based on a transmission signal, are connected to the pads 222 provided at input ends of the signal wirings 220 (lower in FIG. 2) via bonding wires. Pads of a terminal substrate provided with terminating resistance are connected to the pads provided at terminal ends (upward in FIG. 2) of the signal wirings 220 via bonding wires. Pads connected to a ground of the external substrate are connected to the pads 222 provided at one end of the ground wirings 221 (lower in FIG. 2) via bonding wires. Pads connected to a ground of the terminal substrate are connected to the pads 222 provided at the other end of the ground wirings 221 (upward in FIG. 2) via bonding wires.

In each of the modulators 21, the refractive index of the EO polymer 27 placed between the signal wiring 220 and the ground wiring 221 is changed according to voltage applied between the signal wiring 220 and the ground wiring 221. As a result, the phase of light propagated through the waveguide 23 placed along the EO polymer 27 is changed. By change in the voltage applied to the signal wiring 220 according to a transmission signal, light is able to be modulated according to the transmission signal. In each of the modulators 21, the transmission signal is supplied via the pad 222 provided on the signal wiring 220, the pad 222 being at the input end for light.

Structure of Modulator 21

Figure 3:
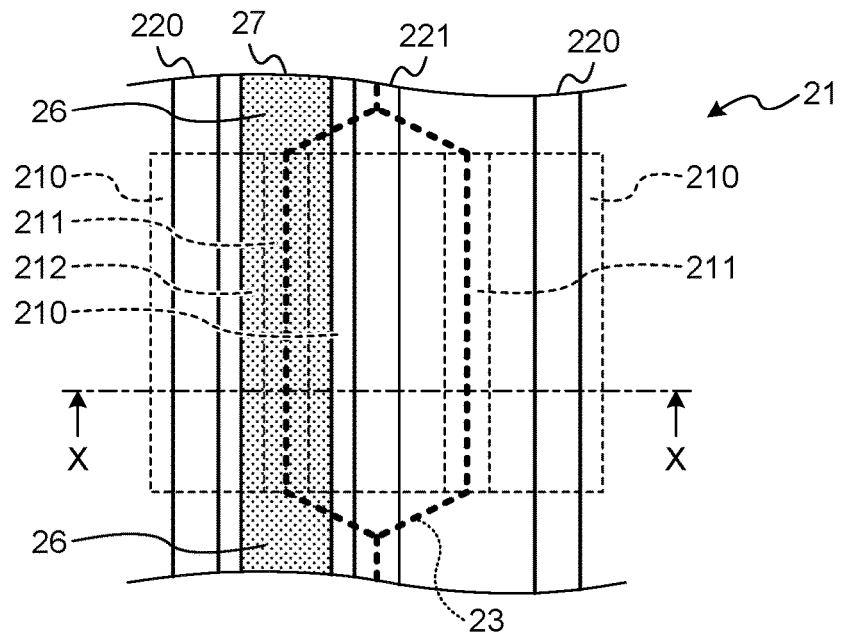
FIG. 3 is a diagram illustrating an example of a structure of a modulator.
Figure 4:
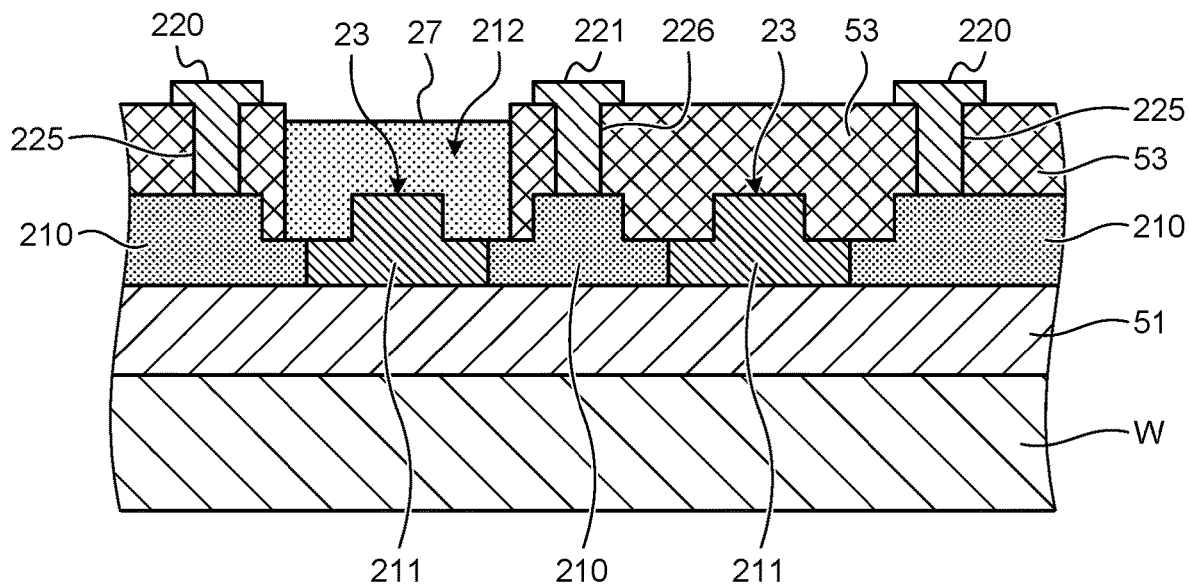
FIG. 4 is an X-X sectional view illustrating the example of the structure of the modulator.

FIG. 3 is a diagram illustrating an example of a structure of the modulators 21. FIG. 4 is an X-X sectional view illustrating the example of the structure of the modulators 21. The X-X cross section in FIG. 3 correspond to FIG. 4. The modulators 21 each include the signal wirings 220, the ground wiring 221, semiconductor layers 210, and silicon layers 211. The signal wirings 220, the ground wiring 221, the semiconductor layers 210, and the silicon layers 211 are arranged along the waveguide 23. The modulators 21 according to the first embodiment are optical modulators that modulate light propagated through the waveguide 23 by changing the phase of the light propagated through the waveguide 23 through change of the refractive index of the EO polymer 27 by means of an electric signal. In FIG. 3, for visibility of the diagram, the EO polymer 27 is hatched.

For example, as illustrated in FIG. 4, the three semiconductor layers 210 and the two silicon layers 211 are formed on a buried oxide (BOX) layer 51 layered on the substrate W of single crystal silicon, for example. One of the two silicon layers 211 has, formed thereon, a groove 212 where the EO polymer 27 is placed. A groove 26 communicates with the groove 212 and the EO polymer 27 in a liquid state flows into the groove 212 via the groove 26. The groove 26 is an example of a relay groove. Furthermore, the EO polymer 27 that has overflowed from the groove 212 flows out to the groove 26. An insulating layer 53 of a silicon oxide, for example, is layered on the semiconductor layers 210 and the signal wirings 220 and the ground wiring 221 are formed on the insulating layer 53.

According to the first embodiment, the semiconductor layers 210 are, for example, silicon added with an n-type impurity, such as phosphorus, at a high concentration. The semiconductor layers 210 may be, for example, silicon added with a p-type impurity, such as boron, at a low concentration. The silicon layers 211 are formed of, for example, silicon, and function as the waveguide 23.

One of the two semiconductor layers 210 arranged on both sides of the silicon layer 211 along the waveguide 23 has the signal wiring 220 connected thereto via a contact 225 formed of a material including metal. Furthermore, the other one of the two semiconductor layers 210 has the ground wiring 221 connected thereto via a contact 226 formed of a material including metal.

Description will be continued by reference back to FIG. 1. The intensity of optical signals that have been modulated by the respective modulators 21 is adjusted by the VOAs 24. The optical signals output from the VOAs 24 are received by the mPDs 28. The VOAs 24 adjust the intensity of the optical signals according to the optical current received by the mPDs 28.

The PR 25 rotates the polarization planes of the optical signals that have been adjusted in intensity by the VOA 24-2. The optical signals that have been adjusted in intensity by the VOA 24-1 are combined by the PBC 29, with the optical signals having their polarization planes rotated, and the combined optical signals are output as an optical signal (Tx_out) from an output end 231 of the waveguide 23.

According to the first embodiment, the EO polymer 27 is placed in the groove 26. The groove 26 includes a groove 260, grooves 261-1 to 261-3, and a groove 262. One end of the groove 260 communicates with a supply pool 270 that is a groove where the EO polymer 27 in the liquid state is supplied, and the other end of the groove 260 communicates with the groove 212 in the YQ modulator 21-4, the groove 212 being where the EO polymer 27 is placed. The supply pool 270 has a width larger than widths of the grooves 212 in the modulators 21. The groove 260 is an example of a first relay groove, the YQ modulator 21-4 is an example of a first optical modulator, and the supply pool 270 is an example of a first terminal groove.

The groove 212 in the YQ modulator 21-4, the groove 212 being where the EO polymer 27 is placed, and the groove 212 in the YI modulator 21-3, the groove 212 being where the EO polymer 27 is placed, communicate with each other via the groove 261-1. The groove 261-1 is an example of a second relay groove, and the YI modulator 21-3 is an example of a second optical modulator. Furthermore, the groove 212 in the YI modulator 21-3, the groove 212 being where the EO polymer 27 is placed, and the groove 212 in the XQ modulator 21-2, the groove 212 being where the EO polymer 27 is placed, communicate with each other via the groove 262-2. The groove 261-2 is an example of a third relay groove. Furthermore, the groove 212 in the XQ modulator 21-2, the groove 212 being where the EO polymer 27 is placed, and the groove 212 in the XI modulator 21-1, the groove 212 being where the EO polymer 27 is placed, communicate with each other via the groove 261-3.

One end of the groove 262 communicates with a terminal pool 271 that is a groove where the EO polymer 27 in the liquid state is collected, and the other end of the groove 262 communicates with the groove 212 in the XI modulator 21-1, the groove 212 being where the EO polymer 27 is placed. The terminal pool 271 has a width larger than the widths of the grooves 212 in the modulators 21. The terminal pool 271 is an example of a second terminal groove.

When the EO polymer 27 is to be placed in the grooves 212 in the respective modulators 21, the EO polymer 27 in the liquid state is supplied to the supply pool 270 by a dispenser. The EO polymer 27 in the liquid state supplied to the supply pool 270 flows in the groove 260 to flow into the groove 212 in the YQ modulator 21-4. The EO polymer 27 in the liquid state that has overflowed from the groove 212 in the YQ modulator 21-4 flows in the groove 261-1 to flow into the groove 212 in the YI modulator 21-3. The EO polymer 27 in the liquid state that has overflowed from the groove 212 in the YI modulator 21-3 flows in the groove 261-2 to flow into the groove 212 in the XQ modulator 21-2. The EO polymer 27 in the liquid state that has overflowed from the groove 212 in the XQ modulator 21-2 flows in the groove 263-3 to flow into the groove 212 in the XI modulator 21-1. The EO polymer 27 in the liquid state that has overflowed from the groove 212 in the XI modulator 21-1 flows in the groove 262 to flow into the terminal pool 271.

The EO polymer 27 flowing into the terminal pool 271 means that the EO polymer 27 is placed in the grooves 212 in the respective modulators 21. Therefore, by check of whether or not the EO polymer 27 has flowed into the terminal pool 271, whether or not the EO polymer 27 is placed in the grooves 212 in the respective modulators 21 is able to be determined readily. Thereafter, the EO polymer 27 in the liquid state that has flowed into the grooves 212 of the respective modulators 21 is cured by annealing, for example.

In the placement of the EO polymer 27 in the grooves 212 in the respective modulators 21, if the EO polymer 27 in the liquid state overflows from the groove 26, the EO polymer 27 that has overflowed from the groove 26 may adhere to the pads 222, for example. When the EO polymer 27 adheres to the pads 222, adhesiveness between the pads 222 and the bonding wires is reduced and contact failure may thus be caused. Therefore, the width of the terminal pool 271 according to the first embodiment is larger than the widths of the grooves 212 in the modulators 21. As a result, the volume of the groove where the EO polymer 27 in the liquid state flows into after being placed in the grooves 212 in the respective modulators 21 is increased and the EO polymer 27 is thereby prevented from overflowing from the groove 26. Accordingly, contact failure between the pads 222 and the bonding wires is able to be prevented.

As the optical transmission device 20 is miniaturized, the grooves 212 in the modulators 21 where the EO polymer 27 is placed in the optical transmission device 20 become smaller. When the grooves 212 become smaller, the EO polymer 27 in the liquid state will be applied to the grooves 212 by use of a nozzle having a thinner distal end. However, when the grooves 212 become smaller, positioning between the thinner distal end of the nozzle and the grooves 212 becomes difficult. Furthermore, when the distal end of the nozzle is thin, a given amount of the EO polymer 27 is not continuously discharged from the distal end of the nozzle depending on the viscosity of the EO polymer 27 in the liquid state, and a sufficient amount of the EO polymer 27 may be not applied to the grooves 212. If a sufficient amount of the EO polymer 27 is not applied to the grooves 212, the amount of change in the phase of light propagated through the waveguide 23 is decreased and the frequency characteristics of an optical signal after modulation may thus be degraded.

Therefore, according to the first embodiment, the grooves 212 in the respective modulators 21 are connected in series via the groove 26, and the EO polymer 27 in the liquid state is supplied from the supply pool 270 provided at an end portion of the groove 26. The width of the supply pool 270 is larger than widths of the grooves 212 in the modulators 21. Therefore, positioning of a distal end of a nozzle of a dispenser that supplies the EO polymer 27 in the liquid state is facilitated. Furthermore, the EO polymer 27 is able to be applied by use of a dispenser having a nozzle with a distal end that is not so thin and the EO polymer 27 is thus able to be discharged readily from the distal end of the nozzle. As a result, a sufficient amount of the EO polymer 27 is placed in the grooves 212 in the respective modulators 21 and degradation of frequency characteristics of an optical signal arising from miniaturization is able to be reduced.

Manufacturing Procedure of Optical Transmission Device 20

Next, a manufacturing procedure for the optical transmission device 20 will be described by reference to FIG. 5 to FIG. 11. FIG. 5 to FIG. 11 are diagrams illustrating an example of a manufacturing process for the optical transmission device 20. FIG. 5 to FIG. 11 exemplify a manufacturing process for the modulators 21 in the optical transmission device 20.

Figure 5:
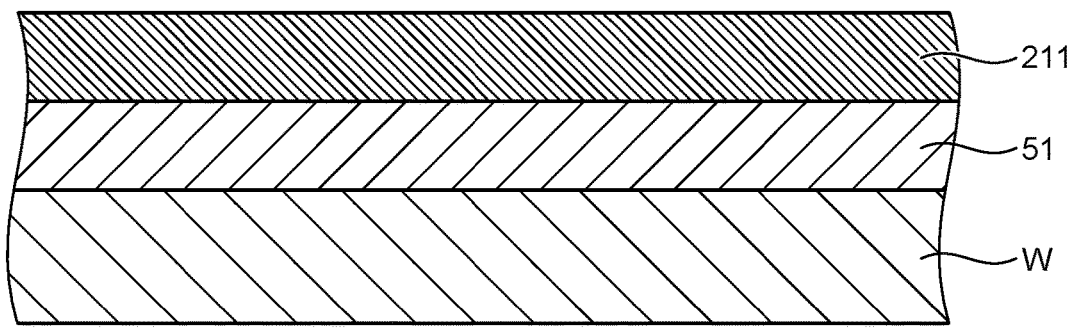
FIG. 5 is a diagram illustrating an example of a manufacturing process for the optical transmission device.
Figure 6:
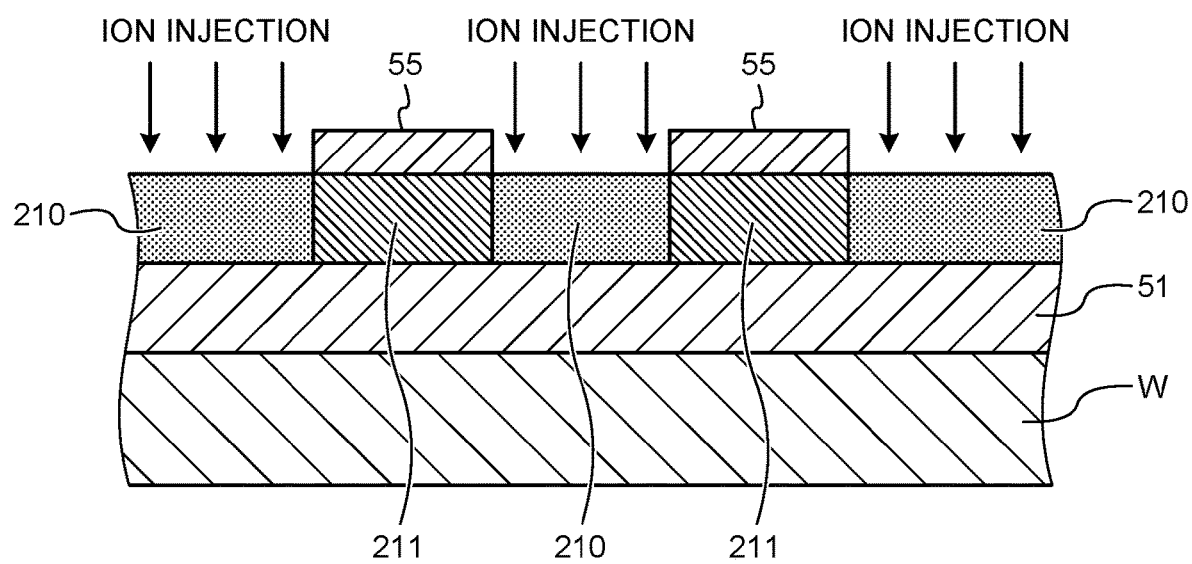
FIG. 6 is a diagram illustrating the example of the manufacturing process for the optical transmission device.

Firstly, as illustrated in FIG. 5, for example, a BOX layer 51 is layered on a substrate W, and a silicon layer 211 is layered on the BOX layer 51. A resist 55 is layered on the silicon layer 211, and the resist 55 is patterned such that a region where a semiconductor layer 210 is to be placed is exposed. As illustrated in FIG. 6, for example, ions of an n-type impurity, such as phosphorus, for example, is injected into the region of the silicon layer 211, the region not being covered by the resist 55. As a result, the semiconductor layer 210, to which the n-type impurity is added at a high concentration, is formed. The resist 55 is then removed.

Figure 7:
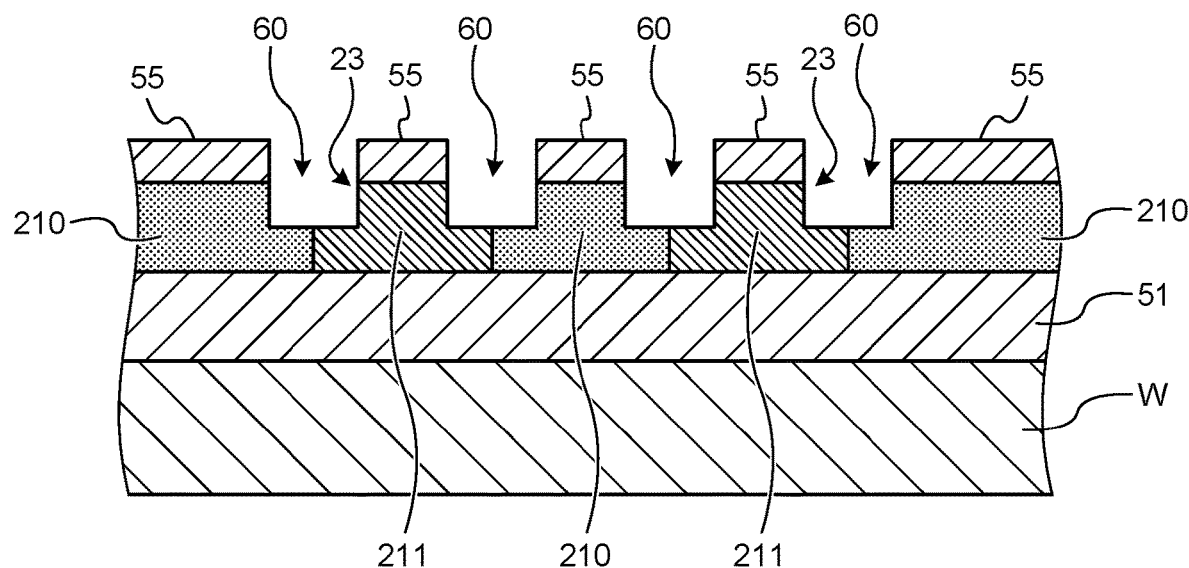
FIG. 7 is a diagram illustrating the example of the manufacturing process for the optical transmission device.

Next, a resist 55 is layered on the silicon layer 211 again, and the resist 55 is patterned such that regions on both sides of a portion of the silicon layer 211 to serve as a waveguide 23 are exposed. Regions of the semiconductor layer 210 and silicon layer 211 are then etched, the regions being not covered by the resist 55. As a result, as illustrated in FIG. 7, for example, recessed portions 60 are formed along the portion of the silicon layer 211 to serve as the waveguide 23. The resist 55 is then removed.

Figure 8:
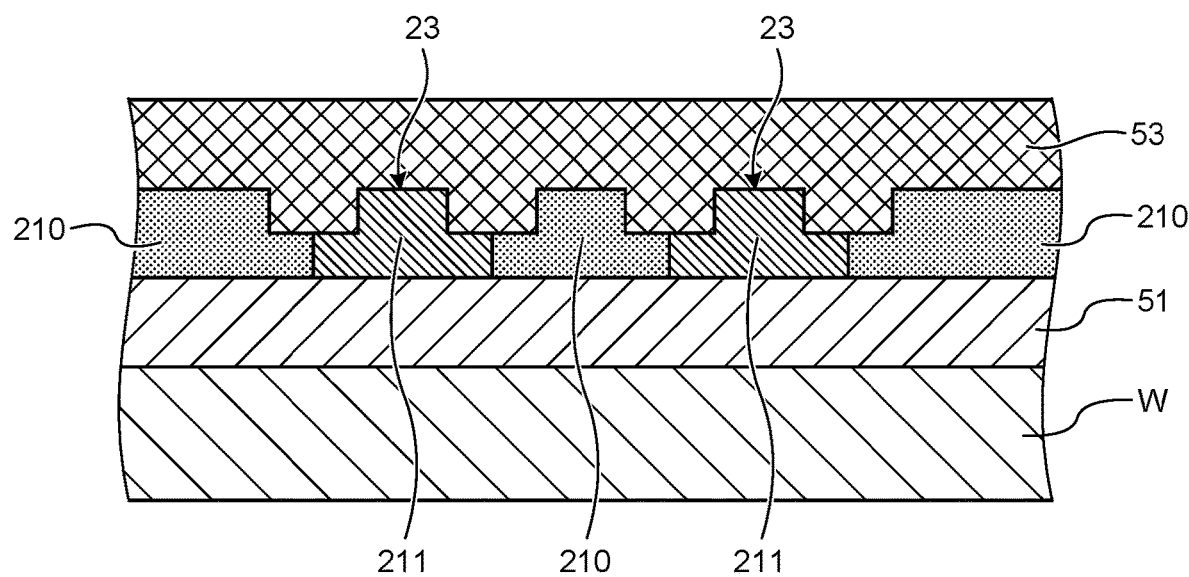
FIG. 8 is a diagram illustrating the example of the manufacturing process for the optical transmission device.
Figure 9:
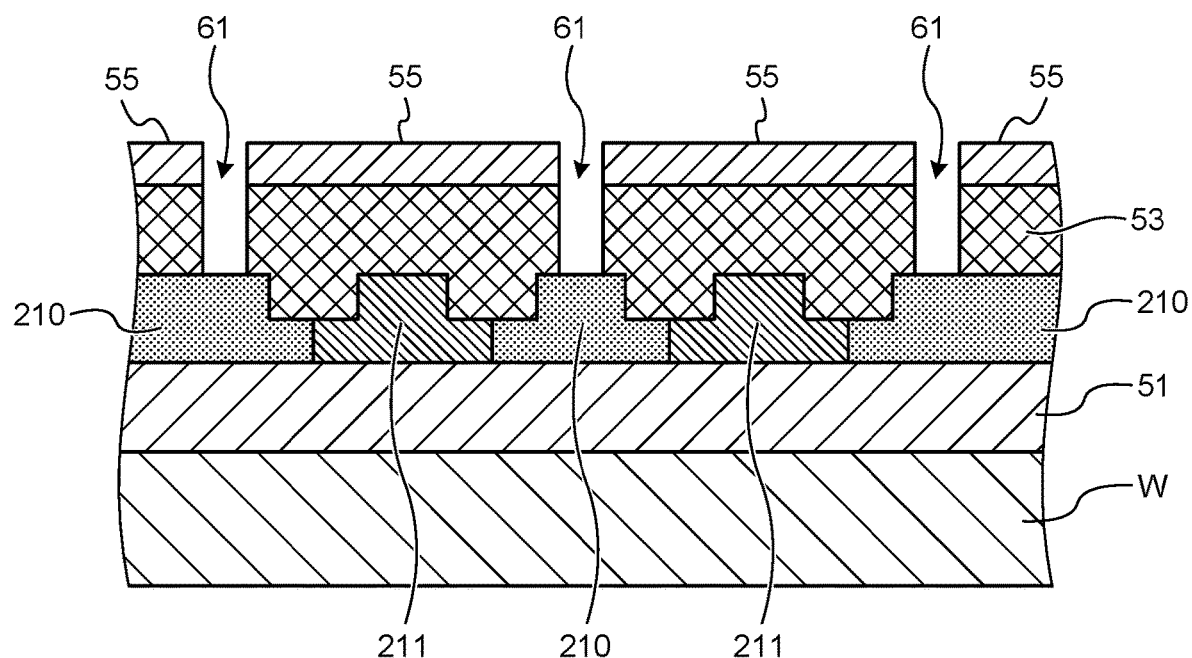
FIG. 9 is a diagram illustrating the example of the manufacturing process for the optical transmission device.

Next, as illustrated in FIG. 8, for example, an insulating layer 53 is layered to cover the semiconductor layer 210 and the silicon layer 211. A resist 55 is then layered on the insulating layer 53, and the resist 55 is patterned such that regions where a contact 225 and a contact 226 are to be formed are exposed. By etching of the regions not covered by the resist 55, as illustrated in FIG. 9, for example, recessed portions 61 are formed in the insulating layer 53. The resist 55 is then removed.

Figure 10:
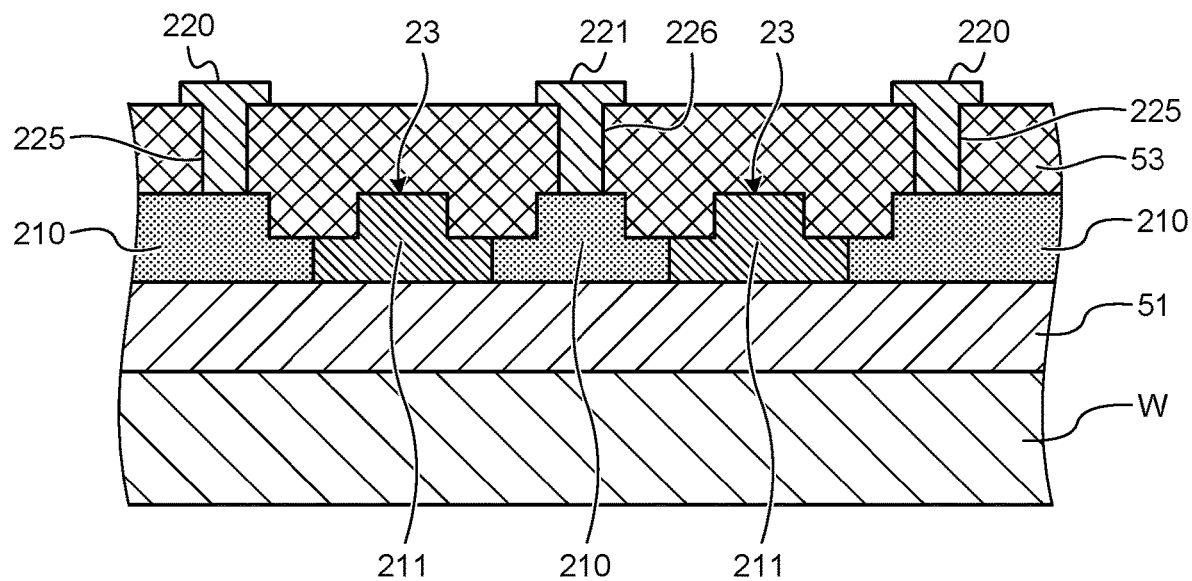
FIG. 10 is a diagram illustrating the example of the manufacturing process for the optical transmission device.

Next, a wiring material including metal is buried into the recessed portions 61 and the wiring material is patterned. As a result, as illustrated in FIG. 10, for example, signal wirings 220, a ground wiring 221, the contact 225, and the contact 226 are formed.

Figure 11:
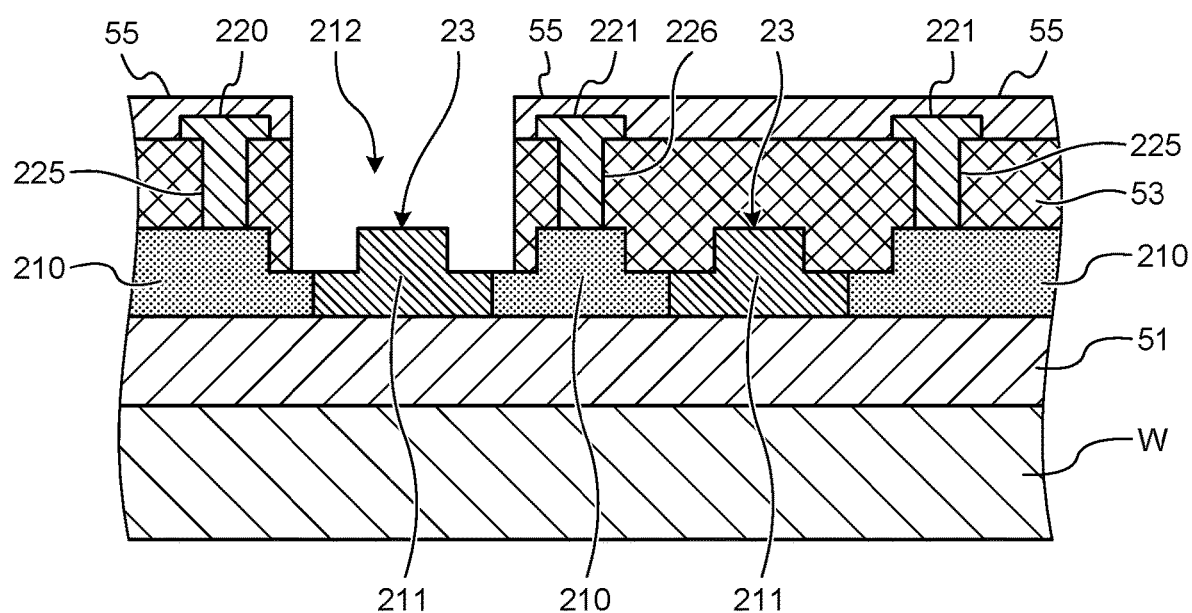
FIG. 11 is a diagram illustrating the example of the manufacturing process for the optical transmission device.

Next, a resist 55 is layered again, and the resist 55 is patterned such that a region where a groove 212 is to be formed is exposed. By etching of the region not covered by the resist 55, as illustrated in FIG. 11, for example, the groove 212 is formed. The resist 55 is then removed.

Next, by supply of the EO polymer 27 in the liquid state into the supply pool 270, the EO polymer 27 is supplied into the groove 212 in the modulator 21. By annealing of the substrate W, for example, the EO polymer 27 in the groove 212 is cured. As a result, the modulator 21 illustrated in FIG. 4, for example, is formed.

Effects of First Embodiment

As disclosed by the above description, the optical transmission device 20 according to the first embodiment has the modulators 21, the groove 26, and the supply pool 270. The modulators 21 each has the groove 212 that is formed on the waveguide 23 formed on the substrate W, the groove 212 having the EO polymer 27 placed therein. Furthermore, each of the modulators 21 modulates light propagated through the waveguide 23 by changing the phase of the light propagated through the waveguide 23 by changing the refractive index of the EO polymer 27 placed in the groove 212 by means of an electric signal. The supply pool 270 is formed on the substrate W and has a width larger than those of the grooves 212. The groove 26 is formed on the substrate W and communicates with the grooves 212 and the supply pool 270. Furthermore, the EO polymer 27 is placed in the groove 26 and the supply pool 270. As a result, positioning of a distal end of a nozzle of a dispenser that supplies the EO polymer 27 in the liquid state is facilitated. Furthermore, the EO polymer 27 is able to be applied by use of a dispenser having a nozzle with a distal end that is not so thin and the EO polymer 27 is thus able to be discharged readily from the distal end of the nozzle. As a result, a sufficient amount of the EO polymer 27 is placed in the grooves 212 in the respective modulators 21 and degradation of frequency characteristics of an optical signal arising from miniaturization is able to be reduced.

Furthermore, the modulators 21 in the above described optical transmission device 20 according to the first embodiment include the YI modulator 21-3 and the YQ modulator 21-4. The groove 26 includes: the groove 260 communicating with the supply pool 270 and the groove 212 of the YQ modulator 21-4; and the groove 261-1 communicating with the groove 212 of the YQ modulator 21-4 and the groove 212 of the YI modulator 21-3. As a result, a sufficient amount of the EO polymer 27 is able to be placed readily in the plural modulators 21. Accordingly, degradation of frequency characteristics of an optical signal arising from miniaturization of the optical transmission device 20 is able to be reduced.

Furthermore, the groove 26 in the above described optical transmission device 20 according to the first embodiment further includes the groove 261-2 communicating with the groove 212 of the YI modulator 21-3. The terminal pool 271 having a width lager than those of the grooves 212 communicates with the groove 212 in the YI modulator 21-3 via the groove 261-2. By check of whether or not the EO polymer 27 in the liquid state has flowed into the terminal pool 271, whether or not the EO polymer 27 is placed in the grooves 212 in the respective modulators 21 is able to be determined readily.

[b] Second Embodiment

In the optical transmission device 20 according to the first embodiment, the grooves 212 of the plural modulators 21 communicate, in series, with the supply pool 270 and the terminal pool 271, via the groove 26. Therefore, if the viscosity of the EO polymer 27 in the liquid state is high, the period of time for the grooves 212 in the respective modulators 21 to be filled with the EO polymer 27 may become long. Therefore, according to a second embodiment, grooves 212 of plural modulators 21 communicate, in parallel, with a supply pool 270 and a terminal pool 271, via a groove 26. As a result, the period of time for the grooves 212 of the respective modulators 21 to be filled with EO polymer 27 is able to be shortened.

Configuration of Optical Transmission Device 20

Figure 12:
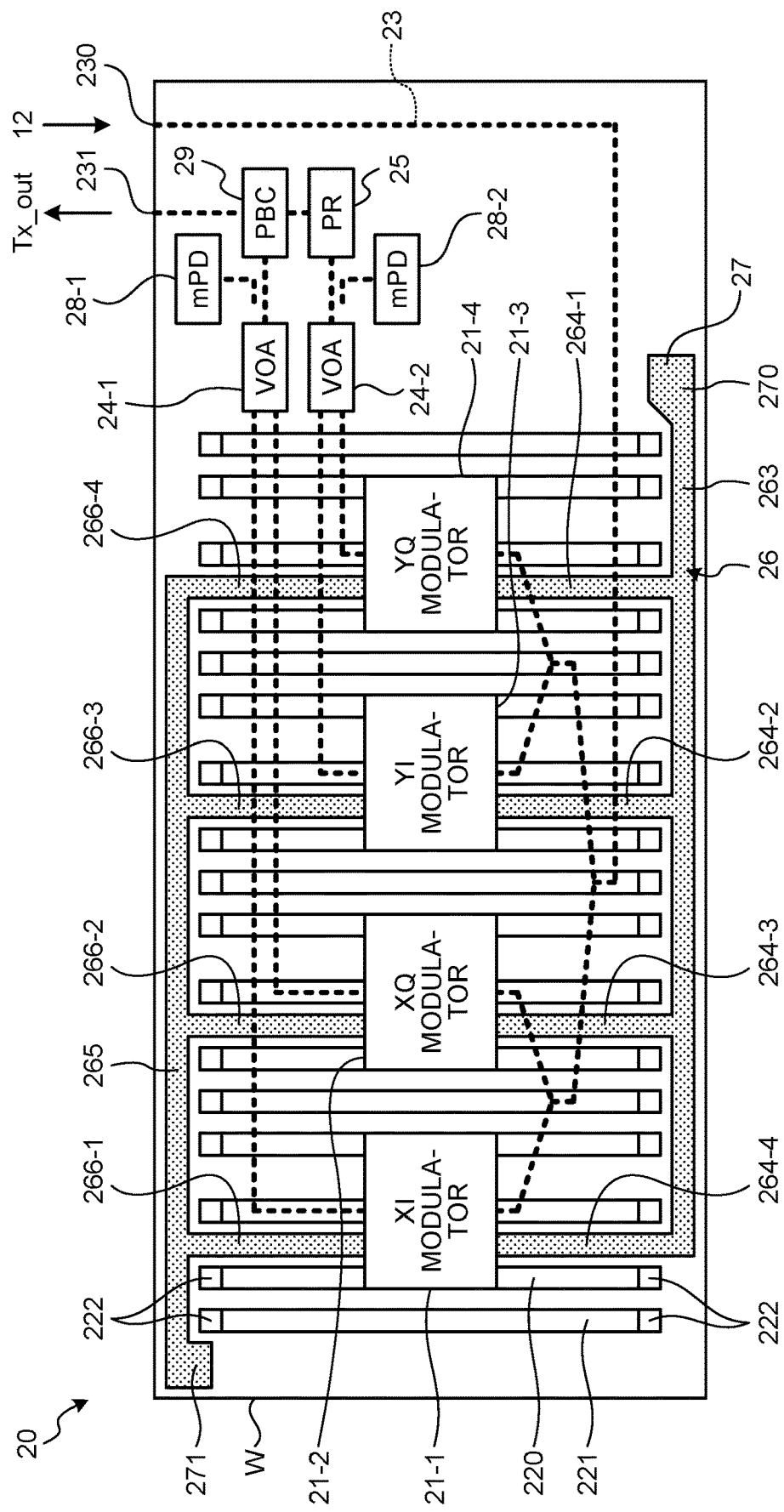
FIG. 12 is a diagram illustrating an example of an optical transmission device according to a second embodiment.

FIG. 12 is a diagram illustrating an example of an optical transmission device 20 according to the second embodiment. Except for those described below, components in FIG. 12 assigned with the same reference signs as those in FIG. 2 are similar to the components described with respect to FIG. 2 and redundant description thereof will thus be omitted.

According to the second embodiment, the groove 26 has a groove 263, grooves 264-1 to 264-4, a groove 265, and grooves 266-1 to 266-4. A supply pool 270 that is a groove having a width larger than those of the grooves 212 in the modulators 21 communicates with an end portion of the groove 263. One end of each of the grooves 264-1 to 264-4 communicates with the groove 263. The other end of the groove 264-1 communicates with the groove 212 in the YQ modulator 21-4. The other end of the groove 264-2 communicates with the groove 212 in the YI modulator 21-3. The other end of the groove 264-3 communicates with the groove 212 in the XQ modulator 21-2. The other end of the groove 264-4 communicates with the groove 212 in the XI modulator 21-1.

The EO polymer 27 in a liquid state supplied to the supply pool 270 flows in the groove 263 and is supplied to the grooves of the respective modulators 21 via the grooves 264-1 to 264-4. As a result, the period of time for the grooves 212 of the respective modulators 21 to be filled with the EO polymer 27 is able to be shortened. The groove 263 is an example of a first common groove, the groove 264-1 is an example of a first branched groove, and the groove 264-2 is an example of a second branched groove.

Furthermore, the terminal pool 271 having a width larger than those of the grooves 212 in the modulators 21 communicates with an end portion of the groove 265. One end of each of the grooves 266-1 to 266-4 communicates with the groove 265. The other end of the groove 266-1 communicates with the groove 212 in the XI modulator 21-1. The other end of the groove 266-2 communicates with the groove 212 in the XQ modulator 21-2. The other end of the groove 266-3 communicates with the groove 212 in the YI modulator 21-3. The other end of the groove 266-4 communicates with the groove 212 in the YQ modulator 21-4.

The EO polymer 27 in the liquid state that has overflowed from the grooves 212 in the respective modulators 21 flows into each of the grooves 266-1 to 266-4. The EO polymer 27 in the liquid state that has flowed into each of the grooves 266-1 to 266-4 flows into the terminal pool 271 via the groove 265. As a result, whether or not the grooves 212 of the respective modulators 21 have been filled with the EO polymer 27 is able to be checked quickly. The groove 265 is an example of a second common groove, the groove 266-4 is an example of a third branched groove, and the groove 266-3 is an example of a fourth branched groove.

Effects of Second Embodiment

As disclosed by the above description, in the optical transmission device 20 according to the second embodiment, the modulators 21 include the YI modulator 21-3 and the YQ modulator 21-4. Furthermore, the groove 26 includes the groove 263, the groove 264-1, and the groove 264-2. The groove 263 communicates with the supply pool 270. The groove 264-1 has the one end communicating with the groove 263 and the other end communicating with the groove 212 of the YQ modulator 21-4. The groove 264-2 has the one end communicating with the groove 263 and the other end communicating with the groove 212 of the YI modulator 21-3. As a result, the period of time for the grooves 212 of the respective modulators 21 to be filled with the EO polymer 27 is able to be shortened.

Furthermore, in the above described optical transmission device 20 according to the second embodiment, the groove 26 further includes the groove 265, the groove 266-3, and the groove 266-4. The one end of the groove 266-4 communicates with the groove 265 and the other end of the groove 266-4 communicates with the groove 212 of the YQ modulator 21-4. The one end of the groove 266-3 communicates with the groove 265 and the other end of the groove 266-3 communicates with the groove 212 of the YI modulator 21-3. The terminal pool 271 having a width larger than those of the grooves 212 in the modulators 21 communicates with the end portion of the groove 265. The EO polymer 27 in the liquid state that has overflowed from the grooves 212 of the YI modulator 21-3 and YQ modulator 21-4 is collected in the terminal pool 271, respectively via the groove 266-3 and the groove 266-4. As a result, whether or not the grooves 212 of the respective modulators 21 have been filled with the EO polymer 27 is able to be checked quickly.

[c] Third Embodiment

In the optical transmission device 20 according to the second embodiment, the widths of the groove 263 and the groove 265 are constant. In contrast, according to a third embodiment, a groove 263 has smaller widths at longer distances from a supply pool 270 and a groove 265 has larger widths at shorter distances from a terminal pool 271. As a result, the period of time for grooves 212 of respective modulators 21 to be filled with EO polymer 27 is able to be shortened. Furthermore, the EO polymer 27 is prevented from overflowing from the groove 265.

Configuration of Optical Transmission Device 20

Figure 13:
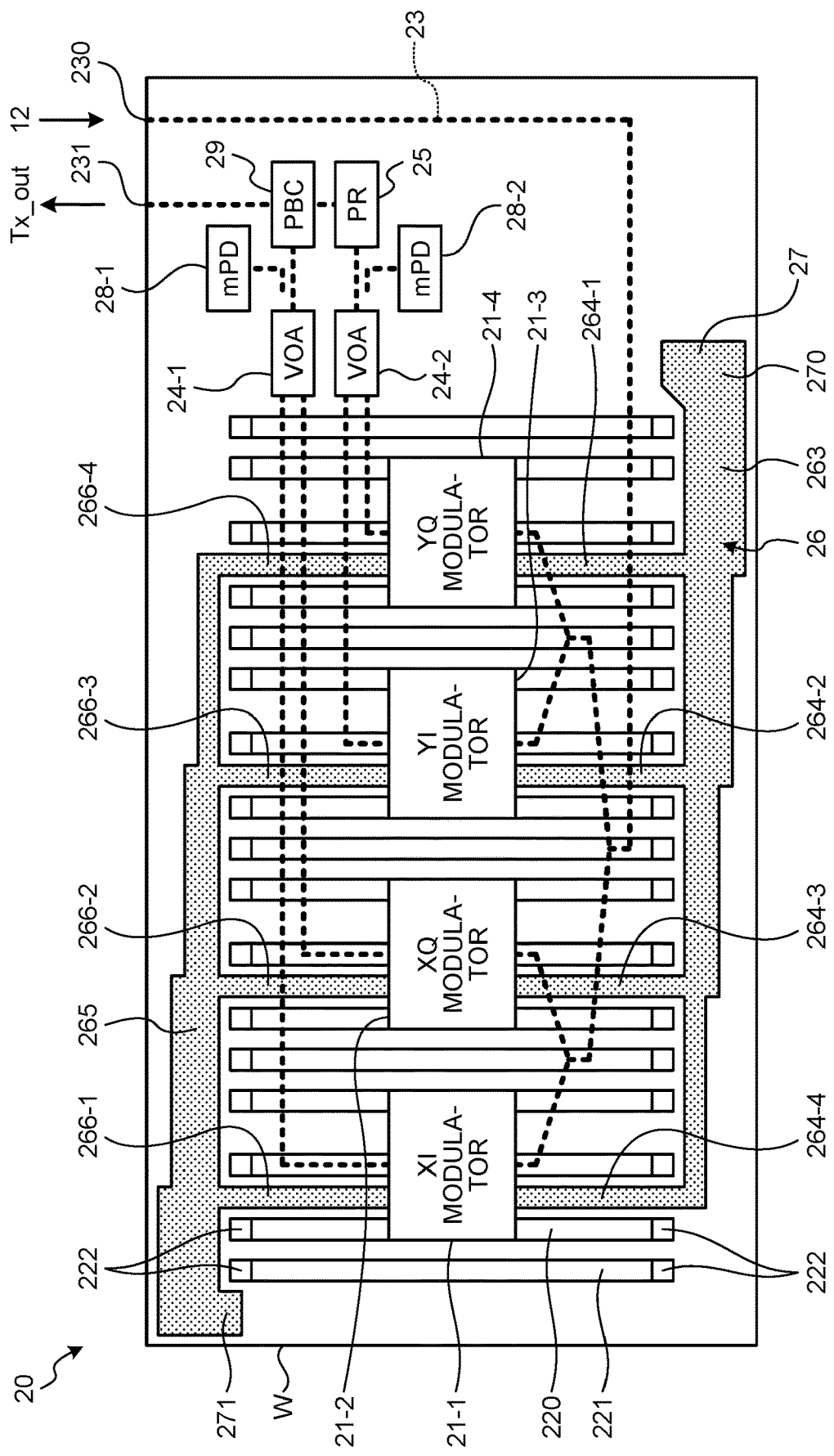
FIG. 13 is a diagram illustrating an example of an optical transmission device according to a third embodiment.

FIG. 13 is a diagram illustrating an example of an optical transmission device 20 according to the third embodiment. Except for those described below, components in FIG. 13 assigned with the same reference signs as those in FIG. 2 or FIG. 12 are similar to the components described with respect to FIG. 2 or FIG. 12 and redundant description thereof will thus be omitted.

According to the third embodiment, a groove 26 has the groove 263, grooves 264-1 to 264-4, the groove 265, and grooves 266-1 to 266-4. The supply pool 270 that is a groove having a width larger than those of the grooves 212 in the modulators 21 communicates with an end portion of the groove 263. One end of each of the grooves 264-1 to 264-4 communicates with the groove 263. The terminal pool 271 having a width larger than those of the grooves 212 in the modulators 21 communicates with an end portion of the groove 265. One end of each of the grooves 266-1 to 266-4 communicates with the groove 265. Hereinafter, when the grooves 264-1 to 264-4 are generally referred to without distinction among them, they will be referred to as the grooves 264, and when the grooves 266-1 to 266-4 are generally referred to without distinction among them, they will be referred to as the grooves 266.

Figure 14:
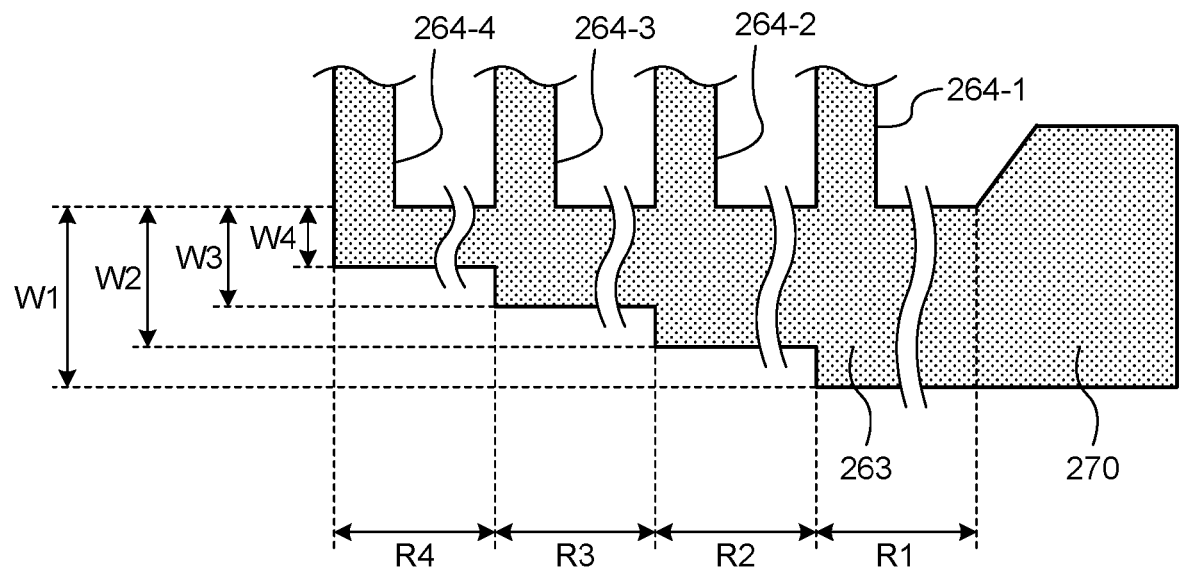
FIG. 14 is an enlarged view for explanation of an example of widths of a groove.

FIG. 14 is an enlarged view for explanation of an example of widths of the groove 263. For example, as illustrated in FIG. 14, a range of the groove 263 will be defined as a range R1, the range being between: a position where the supply pool 270 and the groove 263 communicate with each other (hereinafter, referred to as a communicating position); and a communicating position between the grooves 264-1 and 263. Another range of the groove 263 will be defined as a range R2, this range being between: the communicating position between the grooves 264-1 and 263; and a communicating position between the grooves 264-2 and 263. Still another range of the groove 263 will be defined as a range R3, this range being between: the communicating position between the grooves 264-2 and 263; and a communicating position between the grooves 264-3 and 263. Yet another range of the groove 263 will be defined as a range R4, this range being between: the communicating position between the grooves 264-3 and 263; and a communicating position between the grooves 264-4 and 263.

For example, as illustrated in FIG. 14, a width W1 of the groove 263 in the range R1 is larger than a width W2 of the groove 263 in the range R2. Furthermore, the width W2 of the groove 263 in the range R2 is larger than a width W3 of the groove 263 in the range R3. In addition, the width W3 of the groove 263 in the range R3 is larger than a width W4 of the groove 263 in the range R4. As described above, according to the third embodiment, the width of the groove 263 decreases at every communicating position between the grooves 263 and 264 in a direction separating from the supply pool 270 along the groove 263. As a result, when the EO polymer 27 in the liquid state supplied to the supply pool 270 flows in the groove 263 and passes the communicating positions between the grooves 263 and 264, the liquid level of the EO polymer 27 is prevented from being lowered. Therefore, reduction in the flow rate of the EO polymer 27 flowing in the groove 263 is able to be reduced. The EO polymer 27 is thereby able to be placed quickly in the grooves 212 of the respective modulators 21.

Figure 15:
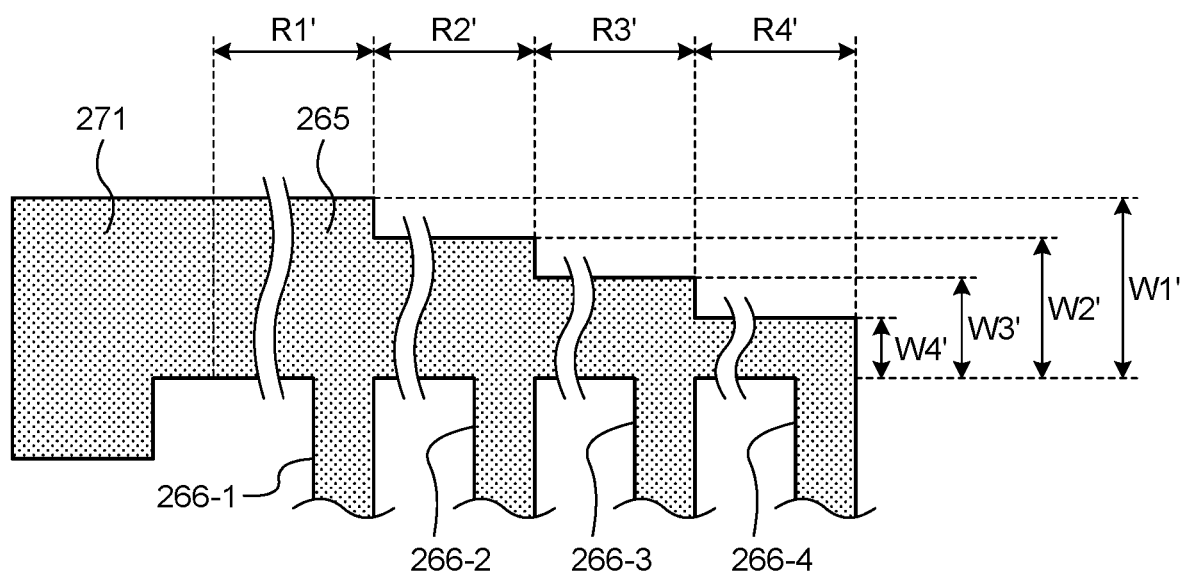
FIG. 15 is an enlarged view for explanation of an example of widths of a groove.

FIG. 15 is an enlarged view for explanation of an example of widths of the groove 265. As illustrated in FIG. 15, for example, a range of the groove 265 will be defined as a range R1', the range being between a communicating position between the terminal pool 271 and the groove 265 and a communicating position between the grooves 266-1 and 265. Furthermore, another range of the groove 265 will be referred to as a range R2', this range being between the communicating position between the grooves 266-1 and 265 and a communicating position between the grooves 266-2 and 265. Still another range of the groove 265 will be referred to as a range R3', this range being between the communicating position between the grooves 266-2 and 265 and a communicating position between the grooves 266-3 and 265. Yet another range of the groove 265 will be referred to as a range R4', this range being between the communicating position between the grooves 266-3 and 265 and a communicating position between the grooves 266-4 and 265.

For example, as illustrated in FIG. 15, a width W1' of the groove 265 in the range R1' is larger than a width W2' of the groove 265 in the range R2'. Furthermore, the width W2' of the groove 265 in the range R2' is larger than a width W3' of the groove 265 in the range R3'. In addition, the width W3' of the groove 265 in the range R3' is larger than a width W4' of the groove 265 in the range R4'. As described above, according to the third embodiment, the width of the groove 265 increases at every communicating position between the grooves 265 and 266 in a direction approaching the terminal pool 271 along the groove 265. As a result, when the EO polymer 27 in the liquid state flows in the groove 265 via the respective grooves 266-1 to 266-4, the EO polymer 27 is prevented from overflowing from the groove 265.

Effects of Third Embodiment

As disclosed by the above description, in the optical transmission device 20 according to the third embodiment, the one end of the groove 264-1 communicates with the groove 263 at the communicating position closer to the supply pool 270 than the communicating position between the grooves 264-2 and 263 is. Furthermore, the width W1 of the groove 263 in the range R1 between the supply pool 270 and the communicating position between the grooves 264-1 and 263 is larger than the width W2 of the groove 263 in the range R2 between the communicating position between the grooves 264-2 and 263 and the communicating position between the grooves 264-1 and 263. As a result, when the EO polymer 27 in the liquid state supplied to the supply pool 270 flows in the groove 263 and passes the communicating positions between the grooves 263 and 264, the liquid level of the EO polymer 27 is prevented from being lowered. Therefore, reduction in the flow rate of the EO polymer 27 flowing in the groove 263 is able to be reduced. The EO polymer 27 is thereby able to be placed quickly in the grooves 212 of the respective modulators 21.

Furthermore, in the above described optical transmission device 20 according to the third embodiment, the one end of the groove 266-3 communicates with the groove 265 at the communicating position closer to the terminal pool 271 than the communicating position between the grooves 266-4 and 265 is. In addition, the width of the groove 265 in the ranges R1' to R3' between the terminal pool 271 and the communicating position between the grooves 266-3 and 265 is larger than the width of the groove 265 in the range R4' between the communicating position between the grooves 266-4 and 265 and the communicating position between the grooves 266-3 and 265. As a result, the EO polymer 27 in the liquid state is able to be prevented from overflowing from the groove 265 when the EO polymer 27 flows in the groove 265 via the respective grooves 266-1 to 266-4.

[d] Other Embodiments

The disclosed techniques are not limited to the above described embodiments, and various modifications of the embodiments are possible within the scope of the gist of the disclosed techniques.

Figure 16:
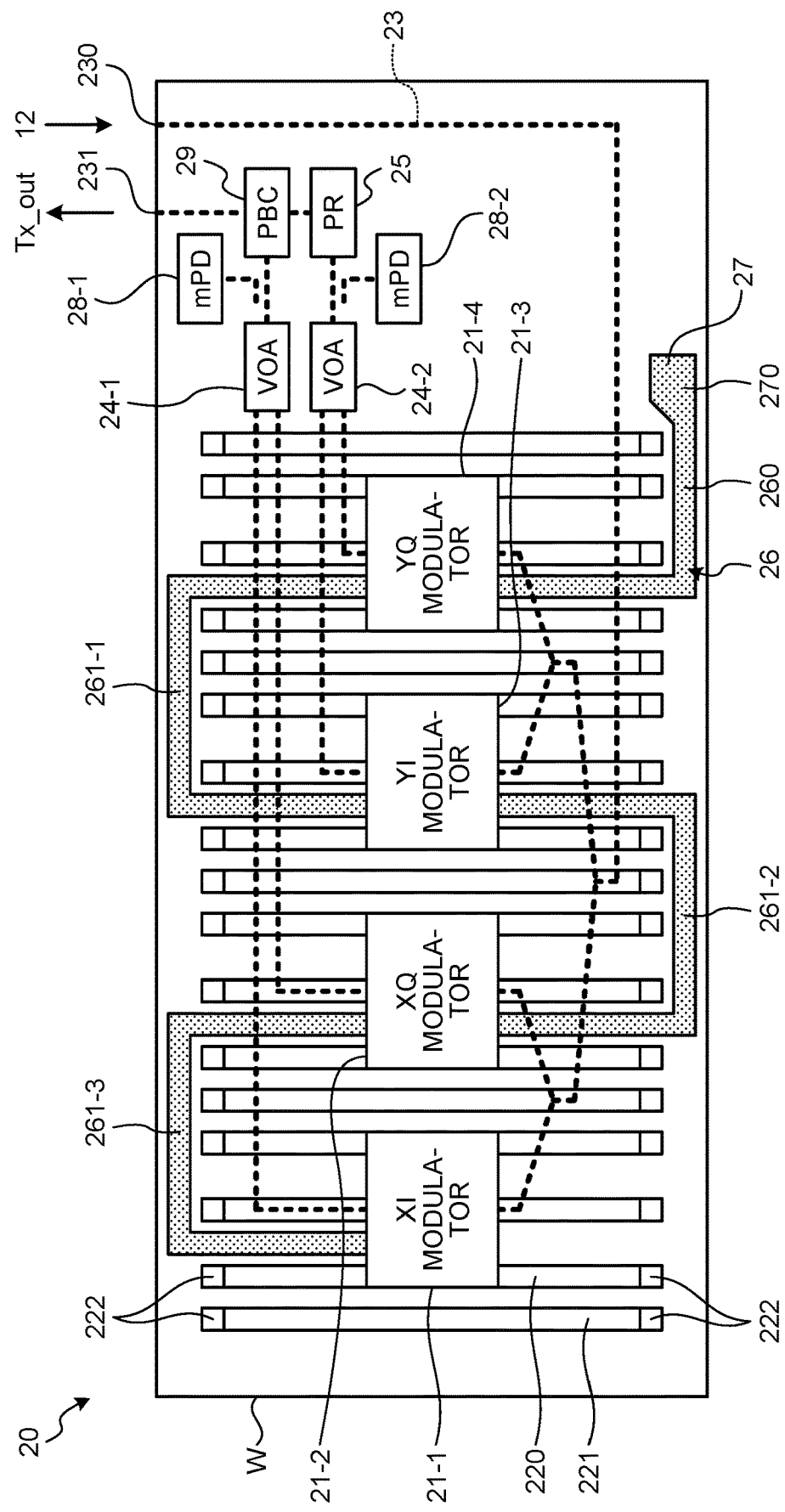
FIG. 16 is a diagram illustrating another example of the optical transmission device according to the first embodiment.

For example, according to the first embodiment, the terminal pool 271 communicates with the groove 212 in the XI modulator 21-1 via the groove 262, but the disclosed techniques are not limited to this example. For example, as illustrated in FIG. 16, an optical transmission device 20 may be not provided with the groove 262 and the terminal pool 271. FIG. 16 is a diagram illustrating another example of the optical transmission device 20 according to the first embodiment. As a result, the amount of EO polymer 27 that would flow into the groove 262 and the terminal pool 271 is able to be cut down and the amount of EO polymer 27 consumed is thus able to be reduced. Furthermore, space for placement of the groove 262 and the terminal pool 271 is thus not needed and the optical transmission device 20 is able to be miniaturized even more.

Figure 17:
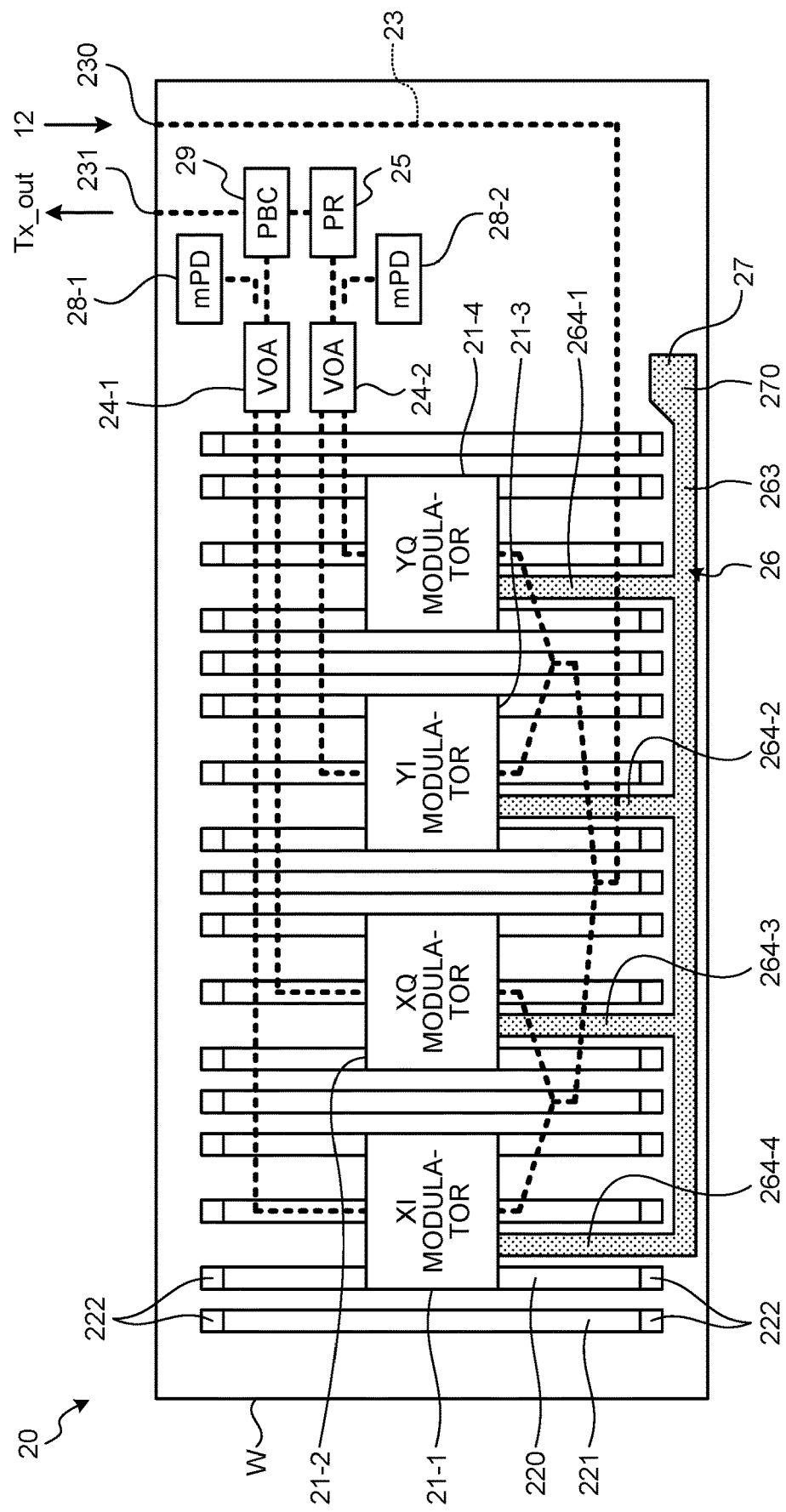
FIG. 17 is a diagram illustrating another example of the optical transmission device according to the second embodiment.
Figure 18:
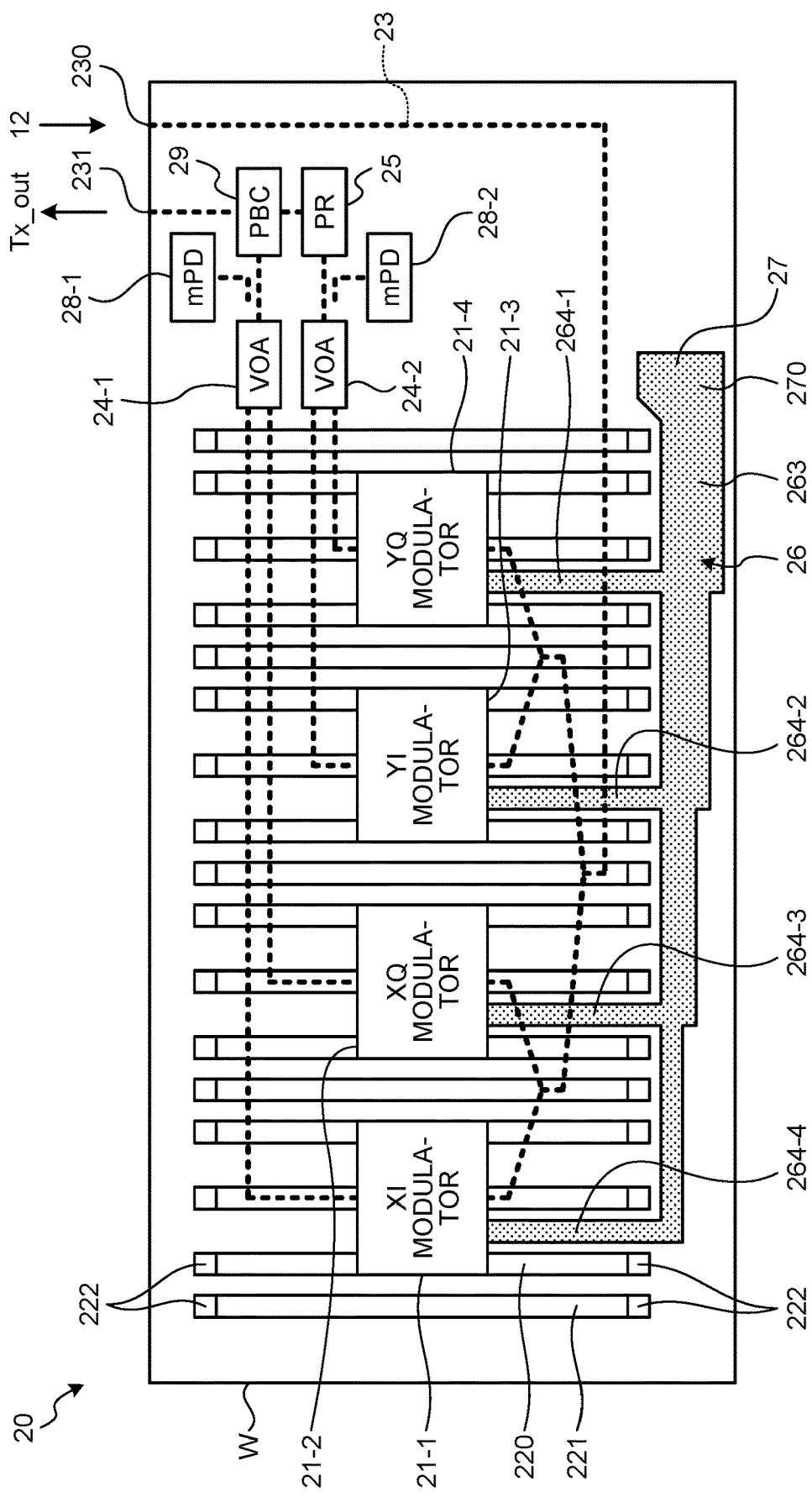
FIG. 18 is a diagram illustrating another example of the optical transmission device according to the third embodiment.

Furthermore, according to each of the second and third embodiments described above, the terminal pool 271 communicates with the grooves 212 in the respective modulators 21 via the grooves 266-1 to 266-4, but the disclosed techniques are not limited to these examples. For example, as illustrated in FIG. 17 and FIG. 18, an optical transmission device 20 may be not provided with the grooves 266-1 to 266-4 and the terminal pool 271. FIG. 17 is a diagram illustrating another example of the optical transmission device 20 according to the second embodiment. FIG. 18 is a diagram illustrating another example of the optical transmission device 20 according to the third embodiment. As a result, the amount of EO polymer 27 that would flow into the grooves 266-1 to 266-4 and the terminal pool 271 is able to be cut down and the optical transmission device 20 is able to be miniaturized even more.

In FIG. 17 and FIG. 18, a groove 263 and grooves 264-1 to 264-4 are arranged on the input side of the respective modulators 21, but the disclosed techniques are not limited to these examples. For example, the groove 263 and the grooves 264-1 to 264-4 may be arranged on the terminal end side of the respective modulators 21. As a result, bonding wires on the input side for connection, across the groove 263, to pads 222 are able to be shortened. Accordingly, degradation in quality of transmission signals to be input to signal wirings 220 is able to be reduced and the quality of the transmission signals is able to be improved.

Figure 19:
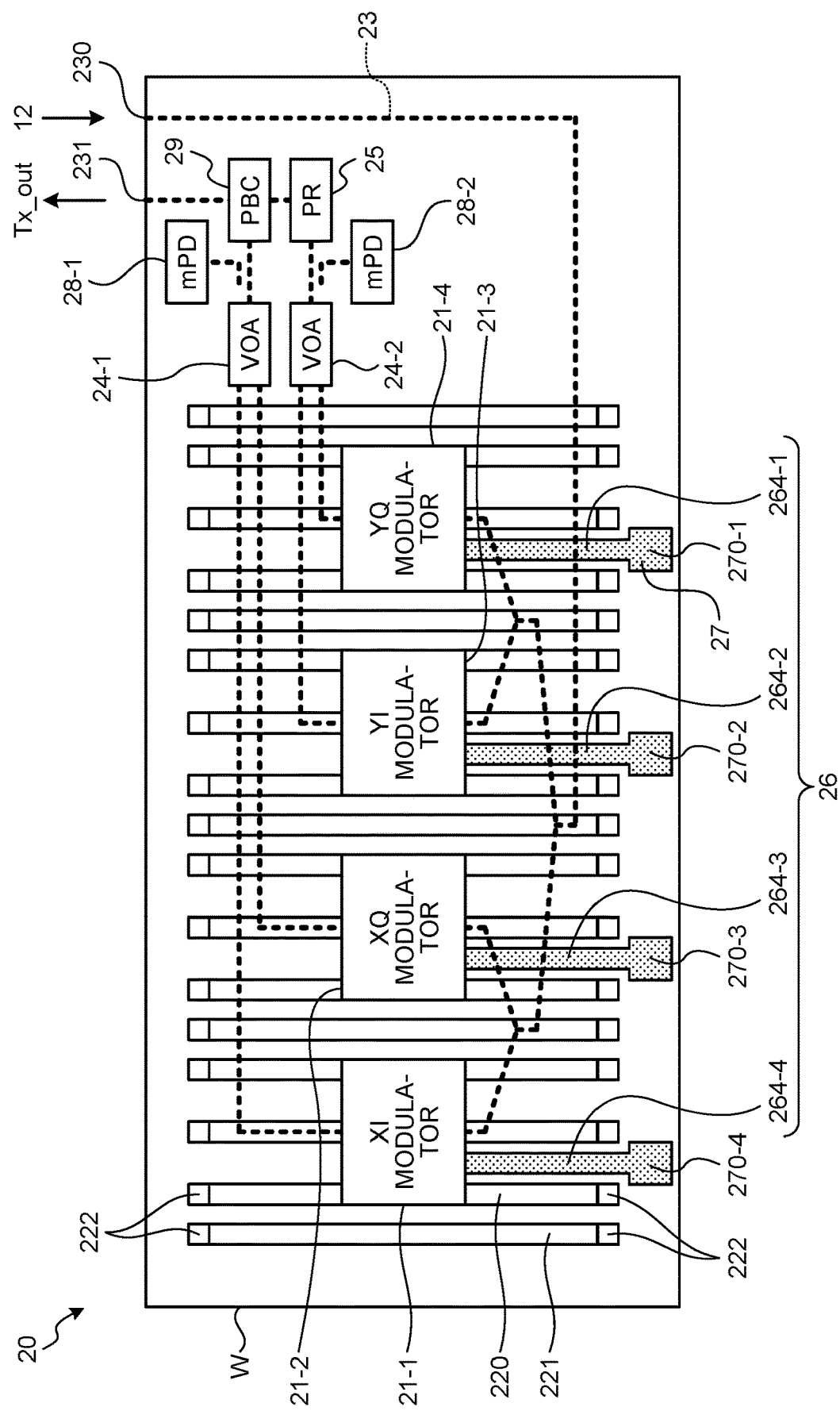
FIG. 19 is a diagram illustrating another example of an optical transmission device.

Furthermore, a supply pool 270 may be provided, as illustrated in FIG. 19, for example, at an end portion of each of grooves 264-1 to 264-4. FIG. 19 is a diagram illustrating yet another example of the optical transmission device 20. EO polymer 27 in a liquid state supplied to a supply pool 270-1 is supplied to a groove 212 of a YQ modulator 21-4 via a groove 264-1. The EO polymer 27 in the liquid state supplied to a supply pool 270-2 is supplied to a groove 212 of a YI modulator 21-3 via a groove 264-2. The EO polymer 27 in the liquid state supplied to a supply pool 270-3 is supplied to a groove 212 of an XQ modulator 21-2 via a groove 264-3. The EO polymer 27 in the liquid state supplied to a supply pool 270-4 is supplied to a groove 212 of an XI modulator 21-1 via a groove 264-4. As a result, distances between the supply pool 270 and the modulators 21 are able to be shortened and the EO polymer 27 is able to be placed in the grooves 212 of the respective modulators 21 even more quickly. In addition, since the example in FIG. 19 is not provided with the groove 263, the amount of the EO polymer 27 that would flow into the groove 263 is able to be cut down and the amount of EO polymer 27 consumed is able to be reduced.

According to an embodiment, degradation of frequency characteristics of an optical signal arising from miniaturization of an optical device is able to be reduced.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical device comprising: a groove on a waveguide formed on a substrate, the groove being formed in a longitudinal direction and having electro-optic (EO) polymer placed in the groove; and an optical modulator that modulates light propagated through the waveguide by changing phase of the light propagated through the waveguide through change of a refractive index of the EO polymer placed in the groove by means of an electric signal, the optical device further comprising:

a first terminal groove formed on the substrate and having a width larger than a width of the groove in the optical modulator, the width of the groove in the optical modulator being along a direction perpendicular to a direction in which the light is propagated; and a relay groove formed on the substrate and communicating with the groove in the optical modulator and the first terminal groove, wherein the EO polymer is placed in the groove in the optical modulator, the relay groove, and the first terminal groove.

2. The optical device according to claim 1, wherein
the optical modulator includes a first optical modulator and a second optical modulator, and
the relay groove includes:
 a first relay groove communicating with the first terminal groove and a groove in the first optical modulator; and
 a second relay groove communicating with the groove in the first optical modulator and a groove in the second optical modulator.

3. The optical device according to claim 2, wherein
the relay groove further includes a third relay groove communicating with the groove in the second optical modulator,
a second terminal groove having a width wider than a width of the groove in the second optical modulator communicates with the groove in the second optical modulator via the third relay groove, and
the EO polymer is placed in the second terminal groove.

4. The optical device according to claim 1, wherein
the optical modulator includes a first optical modulator and a second optical modulator, and
the relay groove includes:
 a first common groove communicating with the first terminal groove;
 a first branched groove having one end communicating with the first common groove and another end communicating with a groove in the first optical modulator; and
 a second branched groove having one end communicating with the first common groove and another end communicating with a groove in the second optical modulator.

5. The optical device according to claim 4, wherein
the one end of the first branched groove communicates with the first common groove at a communicating position closer to the first terminal groove than a communicating position between the second branched groove and the first common groove is, and
a width of the first common groove between the first terminal groove and the communicating position between the first branched groove and the first common groove is larger than a width of the first common groove between the communicating position between the second branched groove and the first common groove and the communicating position between the first branched groove and the first common groove.

6. The optical device according to claim 4, wherein
the relay groove further includes:
 a second common groove;
 a third branched groove having one end communicating with the second common groove and another end communicating with the groove in the first optical modulator; and a fourth branched groove having one end communicating with the second common groove and another end communicating with the groove in the second optical modulator, wherein a second terminal groove having a width larger than a width of the groove in the second optical modulator communicates with an end portion of the second common groove, and the EO polymer is placed in the second terminal groove.

7. The optical device according to claim 6, wherein the one end of the fourth branched groove communicates with the second common groove at a communicating position closer to the second terminal groove than a communicating position between the third branched groove and the second common groove is, and a width of the second common groove between the second terminal groove and the communicating position between the fourth branched groove and the second common groove is larger than a width of the second common groove between the communicating position between the third branched groove and the second common groove and the communicating position between the fourth branched groove and the second common groove.

* * * * *